(12) United States Patent
Pöhler et al.

(10) Patent No.: US 11,561,233 B2
(45) Date of Patent: Jan. 24, 2023

(54) SYSTEM FOR LOADING PIPETTE TIPS

(71) Applicant: STRATEC SE, Birkenfeld (DE)

(72) Inventors: Hans-Joachim Pöhler, Knittlingen (DE); Nico Birkner, Pforzheim (DE); Waldemar Lukhaub, Vaihingen (DE); Kai Schaub, Karlsbad (DE)

(73) Assignee: STRATEC SE, Bitkenfeld (DE)

( * ) Notice: Subject to any disclaimer, the term of this patent is extended or adjusted under 35 U.S.C. 154(b) by 511 days.

(21) Appl. No.: 16/801,938

(22) Filed: Feb. 26, 2020

(65) Prior Publication Data

US 2020/0271681 A1    Aug. 27, 2020

(30) Foreign Application Priority Data

Feb. 26, 2019   (LU) .......................................... 101139

(51) Int. Cl.
| | | |
|---|---|---|
| *G01N 35/04* | (2006.01) | |
| *G01N 35/10* | (2006.01) | |
| *B01L 9/00* | (2006.01) | |
| *B01L 3/02* | (2006.01) | |

(52) U.S. Cl.
CPC ............ *G01N 35/04* (2013.01); *B01L 3/0275* (2013.01); *B01L 9/543* (2013.01); *G01N 35/1074* (2013.01); *B01L 2200/025* (2013.01); *G01N 2035/0434* (2013.01)

(58) Field of Classification Search
CPC ............... G01N 35/04; G01N 35/1074; G01N 2035/0434; B01L 3/0275; B01L 9/543; B01L 2200/025
See application file for complete search history.

(56) References Cited

U.S. PATENT DOCUMENTS

| | | |
|---|---|---|
| 2005/0204832 A1 | 9/2005 | Jessop |
| 2016/0377643 A1 | 12/2016 | Berberich et al. |
| 2017/0269114 A1 | 9/2017 | Bryant et al. |

FOREIGN PATENT DOCUMENTS

EP              2338596 A1     6/2011

*Primary Examiner* — Jennifer Wecker
*Assistant Examiner* — Ali Husain Faraz
(74) *Attorney, Agent, or Firm* — 24IP Law Group USA, PLLC; Timothy R. De Witt

(57) ABSTRACT

A system for loading pipette tips. A system for accommodating pipette tips is provided, comprising a tray having openings for accommodating pipette tips in a plate, wherein the openings have at their upper end a surrounding contour which has curved surface area corresponding to a section of a spherical washer, and pipette tips having at their upper end an offset forming a contact surface for the surrounding contour of the tray's opening, wherein the shape of the contact surface corresponds to the section of a spherical washer so that the centers of both spheres of surrounding contour and contact surface are congruent

15 Claims, 9 Drawing Sheets

SYSTEM FOR LOADING PIPETTE TIPS

CROSS-REFERENCE TO RELATED APPLICATIONS

The present application claims priority to Luxembourg Patent Application No. LU 101139 filed on Feb. 26, 2019. The aforementioned applications are hereby incorporated by reference in its entirety.

BACKGROUND OF THE INVENTION

Field of the Invention

The invention relates to a system for loading pipette tips.

Brief Description of the Related Art

The preparation and analysis of samples is part of the everyday practice in laboratory or clinical work. The formerly manual practice is increasingly becoming automatized and parallelized, thus achieving higher efficiency and precision in the preparation and analysis of samples.

Automated analyser systems for use in clinical diagnostics and life sciences are produced by a number of companies. For example, the STRATEC® SE, Birkenfeld, Germany, produces a number of devices for specimen handling and detection for use in automated analyser systems and other laboratory instrumentation.

A device often used in the preparation and analysis of liquid samples is a pipetting system with pipettes for aspirating or releasing certain volumes of a liquid. In clinical and laboratory analyses, high hygiene standards have to be met. This means that any two different liquid samples must not come into contact unless deliberately so intended. After handling a first liquid sample, any pipette or parts thereof thus have to be at least either cleaned and potentially decontaminated, or even replaced.

So-called disposable tips, which are used to receive and distribute patient samples and reagents are usually loaded with a special receptacle, a so-called tip tray. Very often, so-called microplates are used in automated analyser system for the processing of patient samples, which usually have a capacity of 96 wells. Taking this into account, trays provide usually space for storing or handling up to 96 pipette tips. The 96 tips are usually placed on the trays in holes which are arranged in a grid of 8 by 12 rows.

Different shapes and types of pipette tips and corresponding trays exist depending on the respective assay they are used for. Common to all trays are certain interfaces to the respective loading member of an automated analyzer. Common trays usually have mechanical or geometric features by means of which the presence or even the differentiation of different tips or tray variants can be placed into such a loading station.

Tips of different size often require different interfaces to the tray, if there are fitting interfaces provided at all. Such interfaces may ensure that the tips are properly fixed while being kept in the tray. It is further to be provided that the tips can be surely put onto a pipette and taken out of a tray.

All known solutions are based on arranging pipette tips on a 8×12 grid with a corresponding width, which takes up a relatively large amount of space in a loading member of an automated analyzer occupying thereby a large range from a user interfaces at the front of such a device.

Due to the given grid, the aspect ratio (length to width) of such solutions is relatively small. The resulting large base area can only be stabilized insufficiently by mechanical structures to prevent bending during taking up tips. For that reason, existing solutions are often made of expensive materials which are difficult to manufacture like polycarbonate for instance.

Tip trays known from the prior art use the detection of mechanical distinguishing features, e.g. notches in the tip tray which can be detected by means of light barriers, to detect which kind of tips are loaded.

All trays have in common a large flat surface containing the openings for receiving the pipette tips. A pipette tip's head has a larger diameter than the volume for taking up liquids. The transition area from a pipette tip's head to the volume gets in contact with the surface of a tray surrounding an opening for taking up the pipette tip. These openings have at this point a section whose bottom is in contact with the surface to the tray. Since both contact surfaces of tip and tray are flat and the tip diameter below the transition area is smaller than that of the tray's opening, the respective tip can move or rotate to some extent within the opening. Hence, the axes of the tip and its opening are likely never exactly aligned and thus the pipettor is never positioned exactly above a tip for taking it up.

In manual loading, full trays are usually positioned on a device deck or on a drawer in a designated receptacle which encloses the tray. The tray has to be threaded with the tips hanging down in its openings, which often causes the tips to touch or bump on surfaces of the automated analyzer. As sterilized tips are sometimes required, tips that have been in contact with a surface are contaminated and cannot be used anymore. Additionally, it may be difficult to handle trays or a tray support that with smooth or gloved causing a further risk of mishandling.

SUMMARY OF THE INVENTION

It is an object of the present invention to provide a novel tip-tray with enhanced interfaces between tip and tray and further between tray and automated analyser.

The present invention relates to a system for accommodating pipette tips, comprising a tray having openings for accommodating pipette tips in a plate, wherein the openings have at their upper end a surrounding contour which has curved surface area, wherein said curved surface is a partial section of a single spherical washer, and pipette tips having at their upper end an offset forming a contact surface for the surrounding contour of the tray's opening, wherein the shape of the contact surface is a partial section of a single spherical washer, and wherein the partial sections of the single spherical washer of the tray's contour and the contact surface are identically curved and thus congruent so that the centers of both spheres of surrounding contour and contact surface are also congruent.

In a further aspect the lower side walls of the tray located below the plate may be displaced inwards forming a bearing area.

It is further intended that the tray may have at its longitudinal sides a recessed grip for handling and positioning of the tray.

The tray may further have at its smaller side's notches for its positioning on a loading drawer.

In a further aspect the corners of the tray may have an oblique shape, wherein the corners may have a by 45° inclined surface.

In a further embodiment of the system the tray may have 96 openings in a 4×24 arrangement.

In a further aspect the upper side walls located above the plate of the tray may have openings at the corners of the tray so that the upper side walls can be pushed into a forked light barrier of the loading member.

The system may further comprise a loading drawer with an open section for accommodating the tray.

In a further embodiment of the system, the open section of the loading drawer may have at its longitudinal sides only one side wall and comprises at the upper side of each smaller side of the opening a ridge for accepting a notch of the tray.

In a further aspect the loading drawer may have sliding rails for moving it into and out of a loading member.

It is further envisaged that the loading member may comprise guide rails for moving the loading drawer onto them.

The guide rails of the system may further comprise positioning springs for engaging into the recessed grip of the tray.

In a further embodiment of the system, the loading member may comprise a conveyer belt for transporting trays.

Another object of the invention refers to the use of a system as described above for loading tips in an automated analyser system.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The technical problem is solved by the independent claims. The dependent claims cover further specific embodiments of the invention.

The present invention describes a novel tip tray with improved interfaces, for tip and tray as well as for tray and automated analyser, e.g. a diagnostic device, or with respect to a loading member 50 which is part of such a device. The invented design of the interfaces increases the reliability during the loading process and the tip mount, improves user-friendliness and reduces the required installation space, especially with respect to the front of the device.

The present invention describes a system comprising a receptacle or reservoir for newly developed disposable pipette tips, which can be used in automated analyzer systems like medical diagnostic devices. A tray according to the invention may take up 96 pipette tips.

An important distinguishing feature of the invention is the amended grid geometry, now providing 4×24 openings for pipette tips instead of 8×12 as known from the prior art. The advantage of the different geometry is that the trays become narrower and have a corresponding elongated shape.

Another distinguishing feature of the subject matter of the present invention relates to the geometry or contour of the transition area of the pipette tips in combination with a corresponding geometry surrounding the openings of a tray. The contour is specifically tailored to the geometry of the contact surfaces of the pipette tips.

A tray according to the invention has furthermore recessed grips that facilitate manual loading into a loading member 50 of an automated analyzer. The tray is also suitable for use in automatic loads and has features for its detection with different sensors.

A tray according to the present invention may have several features, wherein each feature provides a different functionality, which will be described in the following.

Figure 1A:
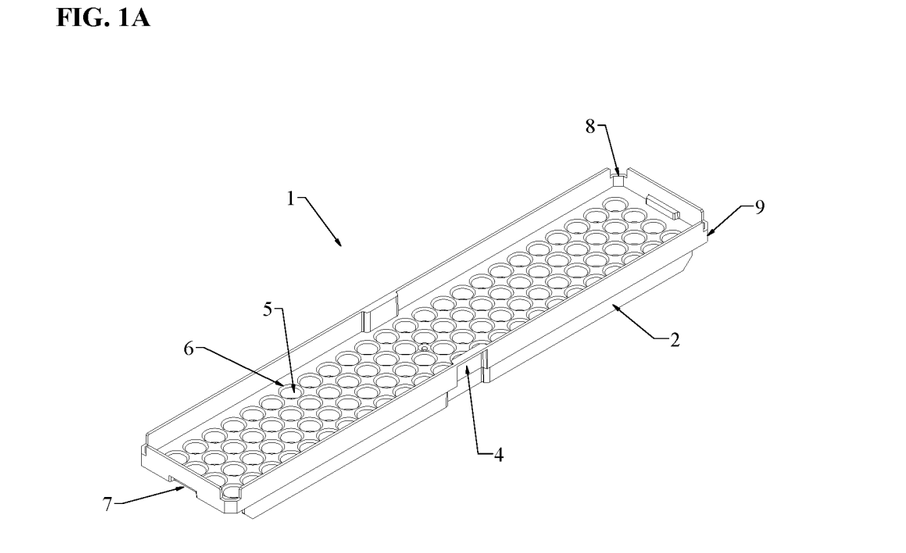
FIGS. 1A and 1B show an overview and a sectional view of a tray with different mechanical features.
Figure 2:
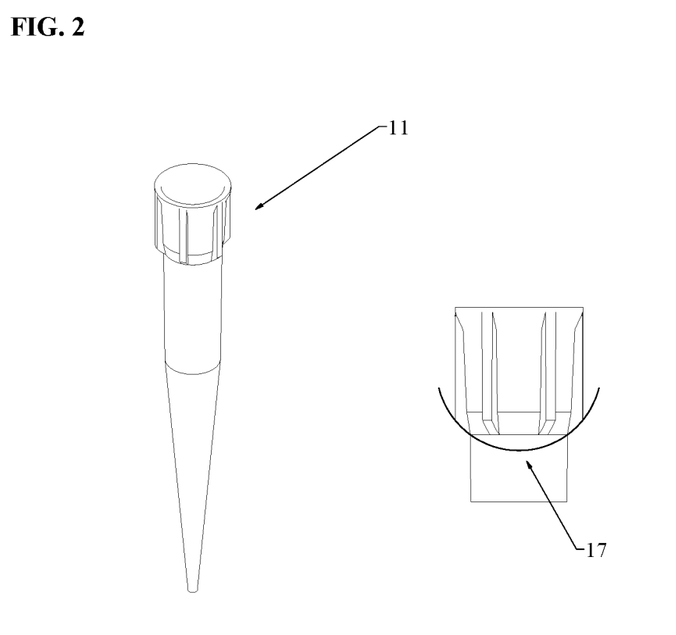
FIG. 2 shows in its left part a disposable pipette tip and on the right side a magnification of the tip's transition area from its head to its volume.

FIG. 1 shows a perspective view of a tray 1 according to the invention. The openings 5 have at their upper end a surrounding contour 6 which corresponds to the contact surface 17 (comp. FIG. 2) of a tip's upper end 11 (not shown in this figure). The term "upper end" refers to the end of a pipette tip with an opening for accommodating a pipette's end (FIG. 2 left). The contour 5 and corresponding contact surface 17 (FIG. 2 right) are formed as a curved surface area of a spherical washer, which is indicated in FIG. 2, right side as a black line. The fictitious tip of sphere and opening of the tray have a pan-like shape. The centres of both spheres are identical and congruent, and the surfaces of the spherical washer are interleaved.

It is to be noted in this context that the shape of a contour 6 belongs to the same or a single partial surface of a sphere. The right part of FIG. 2 shows that in a sectional view or in a side view, the rounded parts on the left and the right side of the central part of the pipette belong to the same arc of a circle, which is important for achieving the technical effects described below. The same applies for the contact surface 17 which is a kind of a collar that in total also belongs to the same or a single partial surface of a sphere and in a side view or in a sectional view a right part and a left part of said curved collar has a rounded shape which belongs to the same arc of a circle. Moreover, contour and contact surface which interact are partial surfaces of the same, single or an identical sphere so that maximum surface areas of them are in contact due to the identical radius of curvature.

Figure 3:
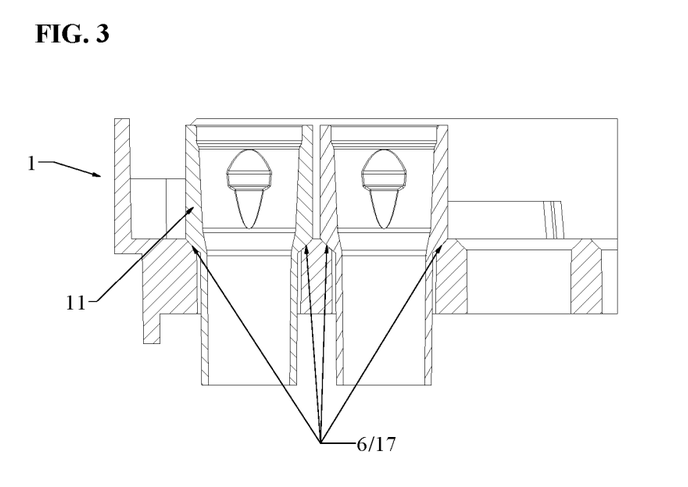
FIG. 3 shows a sectional view through neighbouring pipette tips arranged in a tray to illustrate the contact surfaces between tips and tray.

The advantage of such congruent shapes of contour 6 and contact surface 17 is that a misalignment of pipette tips is avoided, and an angled tray will not cause an angle error of the pipette tips, because the tips will always have a straight downwards orientation caused by gravity due to the spherical contact surface 17 and the surrounding contour 6 (FIG. 3). This means that the pipette tips have always a defined upward position un a tray independent from whether the tray is angled or not.

Figure 1B:
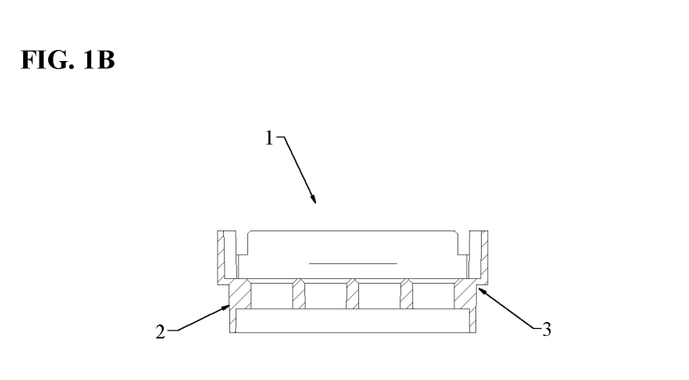

The lower side walls 2 of tray 1 are displaced inwards on the longitudinal sides of tray 1 so that a bearing area 3 results for carrying the tray in a loading member 50. (FIG. 1B). The bearing area 3 is located below a plate of the tray comprising the openings 5 for accommodating the pipette tips.

The side walls of the tray 1 have at each of their longitudinal sides a recessed grip 4 for handling of the tray 1. The recessed grip 4 may also serve for positioning of tray 1, e.g. in loading member 50. A recessed grip 4 may also being suitable for accommodating positioning springs (not shown) for such positioning purposes.

The tray 1 comprises further notches 7 at its smaller sides for a kind of a pre-positioning in a loading drawer 20 of a loading member 50 so that a side-wise falling out of the tray is prevented. The corners 8 of the tray may be oblique, for instance with a 45° inclined surface 9, in order to ease loading and for pushing positing springs (if present) aside.

Figure 4:
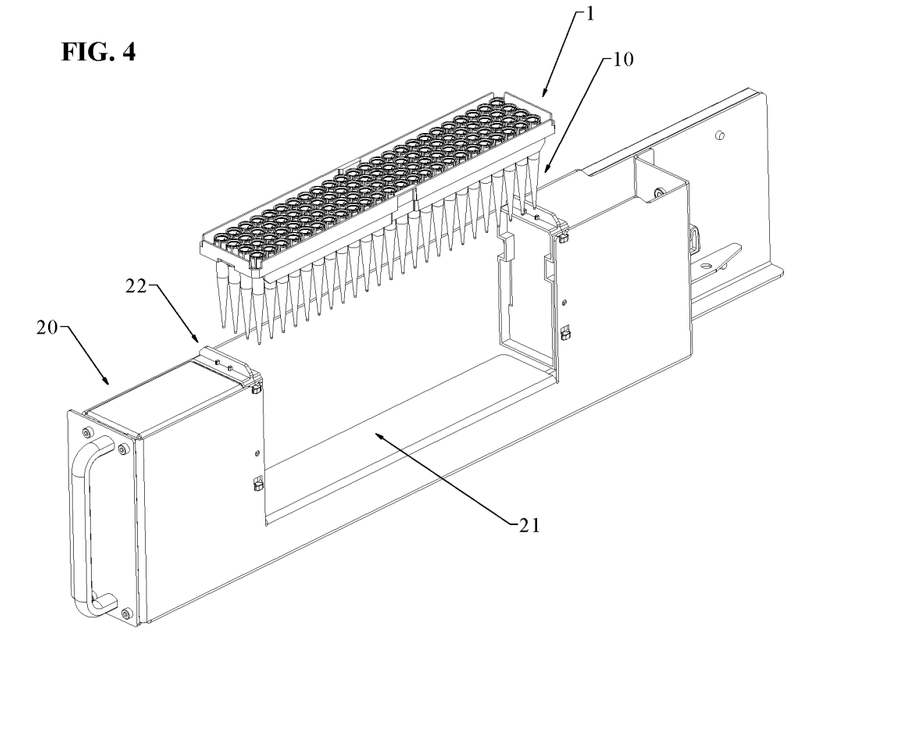
FIG. 4 shows an overview of a drawer with a loaded tray for insertion into the drawer.
Figure 5:
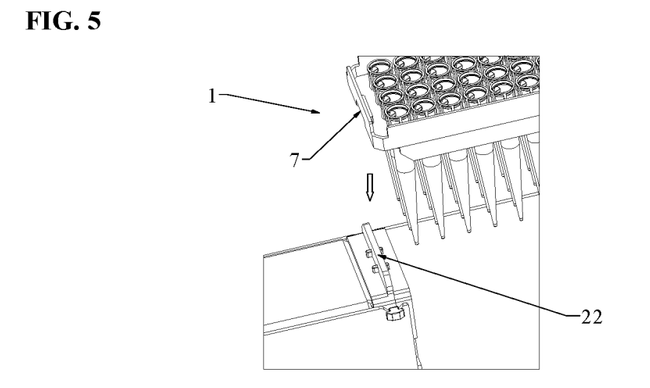
FIG. 5 shows a magnification of the interaction between ridge and tray.
Figure 6:
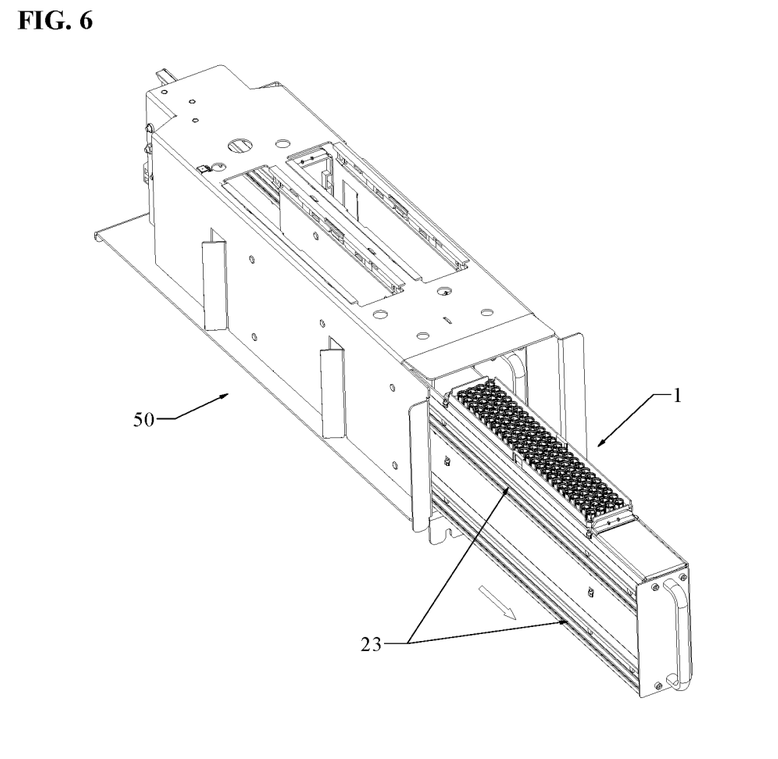
FIG. 6 shows a drawer that is pulled out of a loading member.

A tray 1 is applied to a loading drawer 20 of a loading member 50 (FIG. 4). The tray is applied from above when the loading drawer 20 is pulled out of the loading member 50 (comp. FIG. 6). The loading drawer 20 has an open section 21 for accommodating a tray 1 that carries pipette tips 10 (FIG. 4). The smaller sides of loading drawer 20 have on their upper side a ridge 22 with a shape corresponding to the shape of the tray's smaller side with notch 7. Thus, a misloading or falling out of trays may be prevented. FIG. 5 shows in detail the interaction between ridge 22 and notch 7 of tray 1.

The open section 21 has only one side wall 23 so that tray 1 can also be loaded from the open side or a kind of sidewise. This may ensure that the tips of the pipette tips do not get in contact with a side wall of the open section 21 or get caught by a side wall.

FIG. 6 shows a loading drawer 20 that is pulled out of a loading member 50. The loading drawer 20 has on the closed side of open section 21 (not shown) sliding rails 23. The loading member 50 has means like microswitches (not shown) that may be actuated by loading drawer 20, for instance for monitoring the loading drawer's position or whether loading drawer 20 is open or closed.

Figure 7:
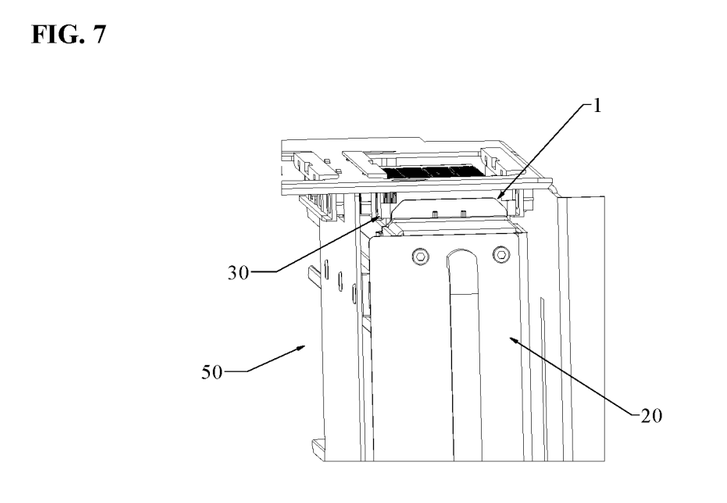
FIG. 7 shows in detail a tray that is pushed onto guide rails when loading drawer is moved into loading member.

FIG. 7 shows in detail a tray 1 that is pushed onto guide rails 30 when loading drawer 20 is moved into loading member 50. Tray 1 is lifted first from the notch 22 entering the loading member 50 and is continuing to lift tray 1 from the loading drawer 20 during ongoing entry into loading member 50. Shortly before the loading drawer 20 closes, tray 1 is only laying on the guide rails 30 of loading member 50.

Figure 8:
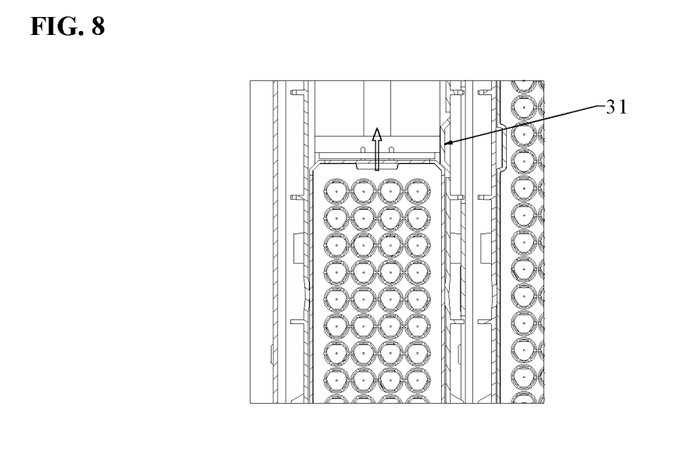
FIG. 8 shows in detail positioning springs of the guide rails.
Figure 9:
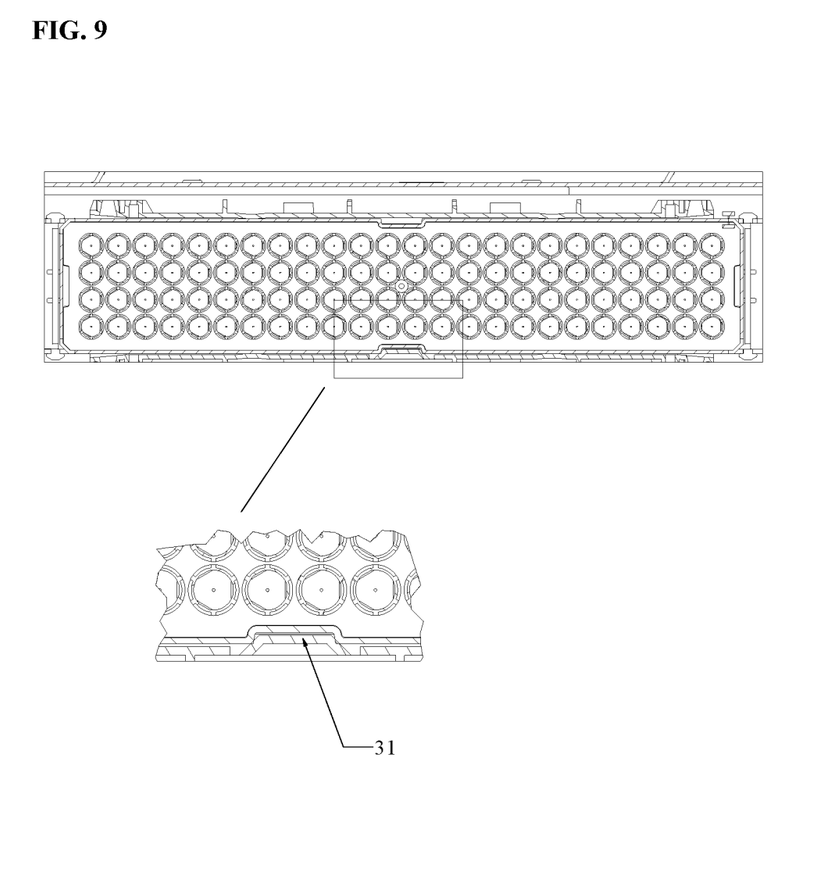
FIG. 9 shows the fixation of a tray by the positioning springs.

Guide rails 30 may comprise positioning springs 31 which are pushed aside by inclined surfaces 9 of the tray's corner 8 as is shown in FIG. 8. If the loading drawer 20 is closed, the positioning spring 31 snap into the recessed grip 4 of the tray and fixes it in its position (FIG. 9). The positioning spring 31 pulls the tray 1 away from the wall of the loading drawer 20 and from the second notch 22 that enters the loading member 20 so that there is no more contact between tray 1 and loading drawer 20. The tray is thus exactly positioned in the stationary part of the loading member 50 and is not affected by any inaccuracies or tolerances of the loading drawer 20.

Figure 10:
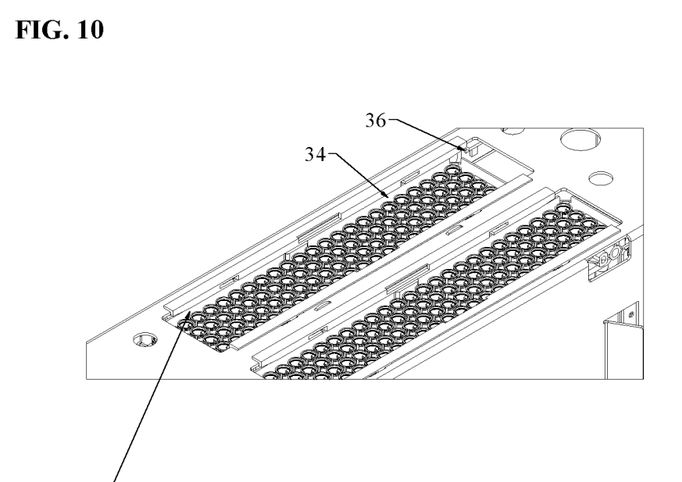
FIGS. 10 and 11 show openings or recesses of a tray's side wall.
Figure 11:
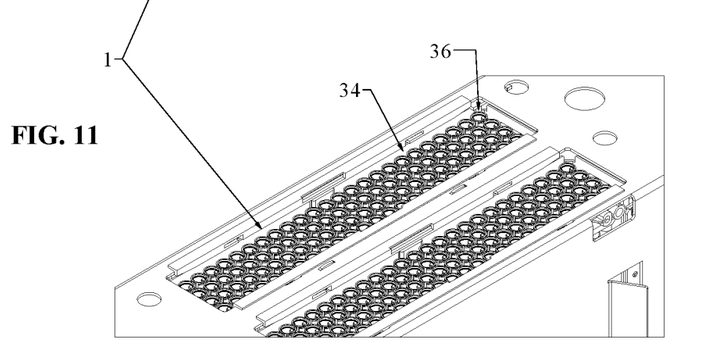

The upper sides walls 34 of tray 1, located above the plate bearing the opening for the pipette tips, may further have openings or recesses at the corners 8 so that a side wall 34 can be pushed into a forked light barrier 36 as is shown in FIG. 10 and FIG. 11. It is also possible to integrate light barriers into a tray guiding (not shown).

The color of a tray may correlate with a specific type of pipette tips that are carried by a respective tray. The tray may further comprise areas a higher surface roughness so that these areas reflect light more defined/diffused and thus more reliably for detection by a color sensor.

The loading member can be designed for a loading an increased number of trays, e.g. for loading a maximum often trays. Due to small changes in the length, the loading member can be adapted to other loading volumes or the available depth of the device and can therefore be used flexibly.

Figures 12A, 12B:
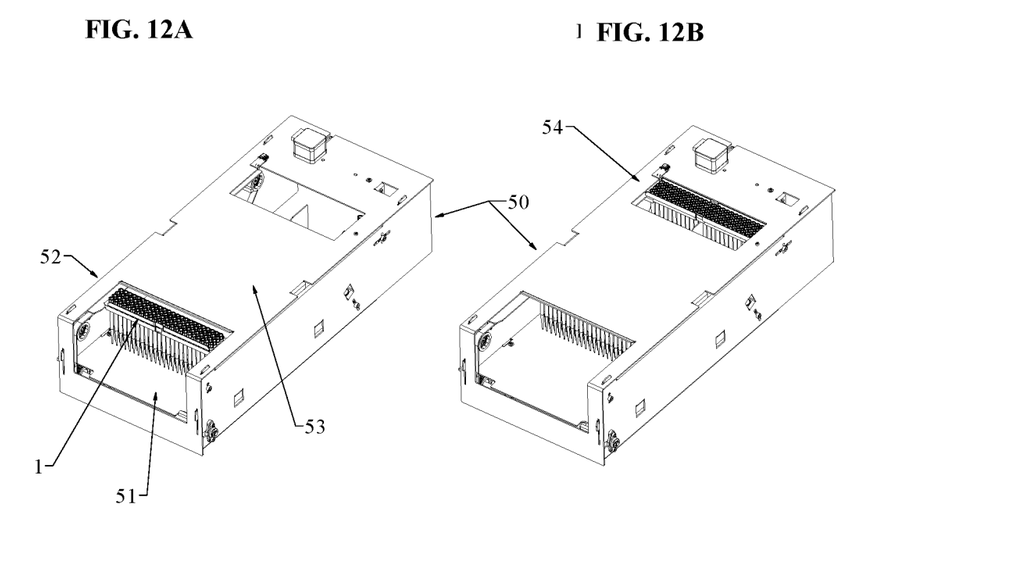
FIGS. 12A and 12B show a loading member for taking up multiple trays.

In such a configuration, which is shown in FIG. 12A and FIG. 12B, the trays are to be manually fed to the loading member 50. Full trays 1 can be removed by the user from their packaging and placed individually at the predetermined loading position 52 in the front area of loading member 50. For this purpose, the trays are placed by the user on a support surface of a base plate 51, which results from the upper fold of a cover plate 53. The trays can either be inserted directly from above or slid in diagonally from the front, which facilitates user-friendly loading.

Cover plate 53 and base plate 51 cover most of the moving parts of the loading member 50. It is only possible for the user to place the trays on the bearing surface of base plate 51 (FIG. 12A). The bearing surfaces may have chamfers (not shown) to simplify the loading process.

Figure 13:
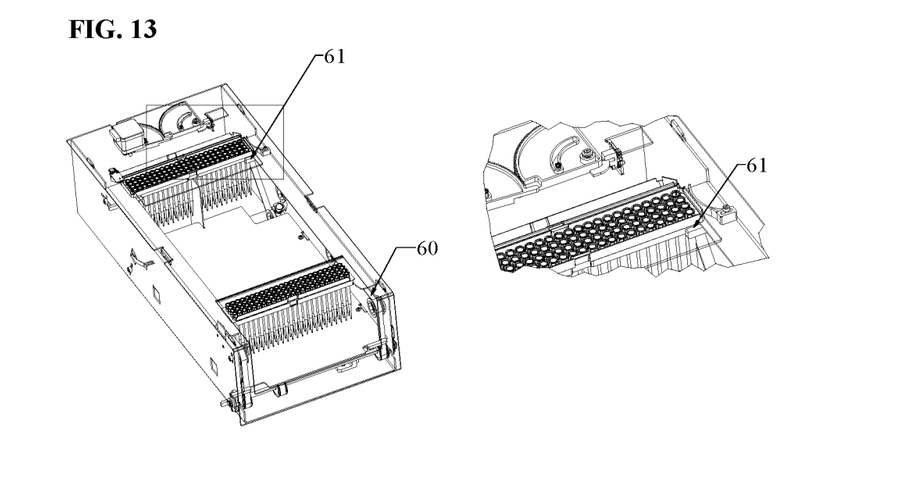
FIG. 13 shows a cam of a cam belt and its location in the loading member

The inserted tray can be moved manually one position further to add another tray. The process can be repeated until the first tray of the tray chain abuts against a cam 61 of the cam belt 60 (FIG. 13). Cam 61 acts as a stop and prevents overloading of the system. Thus, the system can be fully loaded at any time.

The loading member 50 moves a tray 1 that is located in front of a cam 61 until the tray reaches a pipetting position 54 in the loading member 50 (FIG. 12) in which the pipettor removes the tips (not shown).

The cam belt 60 which transports trays 1 is driven by a motor of a transport system (not shown). The cam belt 60 including the cam 61 runs below a guide rail 30. Therefore, entire area above the trays is free and can be used for position detection.

Figure 14:
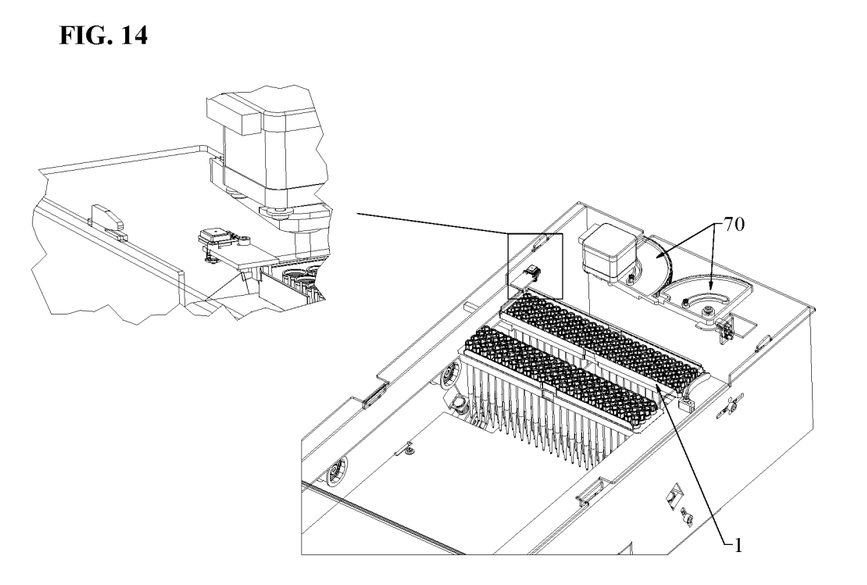
FIG. 14 shows the alignment of two consecutive trays.

The cam belt 60 moves the trays 1 until a light barrier at the pipetting position 54 is interrupted by a tray (FIG. 14). Possible gaps between inserted trays will be closed. Thus, empty space is avoided, and it does not matter if the cam belt 60 moves one or more trays. If the light barrier is interrupted, a tray is located at the pipetting position 54 and has been pushed against the stop. After the light barrier has been interrupted, the motor moves the cam a little bit further to ensure that the positioned tray is pressed against the stop. This will position the tray perfectly and allow the pipettor picking pipette tips.

To remove the tips, the pipettor must exert some pressure on the tray. Due to the trays elongated shape and its support only at its smaller sides, the tray is subject to increased deflection. To counteract this, the loading member may provide a support for the tray at the pipetting position, e.g. a fin (not shown) supporting the tray's lower side, on which the tray rests centrally.

Figure 15A:
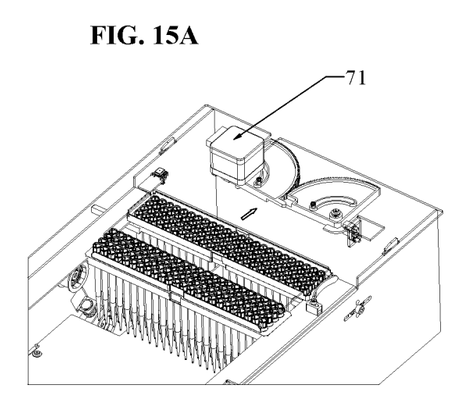
FIGS. 15A and 15B show the movement of trays in a discharge area.
Figure 15B:
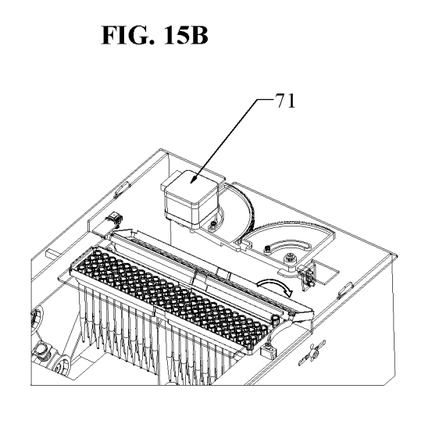

Once a tray 1 has been processed, the empty tray must be discarded. A movable, empty tray 1 is stopped by a movable stop 70 that is provided at the end of pipetting position 54 (FIG. 14). In order to eject the tray, the motor 71 of a positioning unit of the movable stop 70 moves it out of the discharge area (FIG. 15A). If the light barrier of the positioning unit gives the corresponding signal, the movable stops 70 are located outside the discharge area and the motor of the transport system begins to turn again to push the processed tray 1 into the discharge area (FIG. 15B).

The trays are moved until the light barrier of the transport system is no longer interrupted, which means that the tray was pushed from its support surface and thereby dropped. In the discharge area there are no interference contours and the tray falls safely into a waste container located underneath.

Once the tray has been safely ejected, the stops are moved back to their original position. Reaching that position is monitored by a light barrier. Subsequently, the motor of the transport system moves the driving cam until the cam belt has pushed another tray against the stop while the light barrier at the pipetting station is interrupted.

The motor continues to be energized at standstill to hold its position and to use the cam as a stop.

If the cam has no longer a tray in front of it, it must be transported back to the front of the module in order to take along newly loaded trays and push them backwards. For this purpose, the cam belt moves the cam through the lower area of the module and then through the loading area. The user is signaled during this time that he is not allowed to load the loading member with trays in order to avoid collision of the user or a tray with the cam during loading trays. Apart from the described procedure, it is always possible for the user to fully load the module, regardless of how many trays are already loaded.

If the cam belt rotates for a certain time, e.g. three complete revolutions, without the light barrier being interrupted by a loaded tray, the transport system stops until new trays have been loaded. The cam remains in the rear area near the pipetting position of the loading member to allow new trays to be loaded.

Recognition of reloaded trays may for example be done by an additional light barrier in front of the loading member. Alternatively, it is also possible to recognize the opening and closing again of a flap attached to the front of the device for covering the loading member. If the flap is opened and closed again without loading a tray, the transport system would only return to perform a defined number of drive three turns and then stop again. Another alternative to "communicate" to the device newly loaded trays would be a loading dialog to be confirmed by the user via the device software.

High-throughput systems require a large number of tips, which should require the smallest possible space in the device. Therefore, the fully loaded trays are packed in a so-called "twin pack" arrangement, which has the highest density of all packaging arrangements. A twin pack comprises two trays loaded with pipette tips, wherein their tips are stacked together. Several twin packs are provided in a large package, which is fed to the system and serves as a warehouse.

From such a warehouse, the twin packs are removed and transported to the pipetting station. In order to make the tips accessible to the pipettor, the twin pack is automatically opened at the pipetting station and closed again after removing the tips. The twin pack is then transported to a turning station, where it is rotated by 180° to bring the full tray to the accessible top. If a twin pack is completely processed and empty, it is moved to another position of the pipetting station and loaded with used tips. When the Twin Pack is completely filled, it is transported down to another large package that the user removes and discards as soon as it is filled completely.

The advantages of the present invention can be summarized as follows:

- The tray offers an innovative handle concept via ergonomic troughs in the side walls, which can also be used for positioning in a loading member.
- The strictly symmetrical design of the tray also prevents incorrect loading.
- The specially tailored to the tips contour of the receiving openings ensures an ideal fit and always optimal fit of the tip in the opening.
- The narrow design leads to a smaller footprint for modules with longitudinal load and thus allows a more effective use of space within a diagnostic device in the field of user interfaces. The arrangement in the module with two independent loading tracks enables continuous loading in the smallest space.
- In addition, the narrow design and the resulting long side bearing surfaces lead to a small deflection in the tip recording by the pipettor.
- The slim design also means that the tray can be produced more cheaply without losing stability. Since now also easier to process plastics can be used. This eliminates the costly refilling of the trays as it is now financially viable to supply them to the normal plastic waste and to recycle them.
- The basic shape of the tray is the same when using color additives in the production, where it can be used in different colors for a total of eight different Tip variants. With the aid of a color sensor in the loading module, the respective tray color and thus also the tip variant can be determined.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS

1 tray
2 lower side walls 3 bearing area
4 recessed grip
5 openings
6 contour
7 notch
8 corner
9 inclined surface
10 pipette tip
11 contact surface
17 contact surface
20 loading drawer
21 open section
22 ridge
23 sliding rail
30 guide rails
31 positioning spring
34 upper side wall
36 forked light barrier
50 Loading member
51 base plate
52 loading position
53 cover plate
54 pipetting position
60 cam belt

What is claimed is:

1. A system for accommodating pipette tips, comprising:
a tray having openings for accommodating pipette tips in a plate, wherein the openings have at their upper end a surrounding contour which has a curved surface area, wherein said curved surface area is a partial section of a single spherical washer, and
pipette tips having at their upper end an offset forming a contact surface for the surrounding contour of the tray's opening, wherein the shape of the contact surface is a partial section of a single spherical washer, and wherein the shape of the partial sections of the single spherical washer of the tray's contour and the contact surface are identically curved and thus congruent, so that the centers of both spheres of surrounding contour and contact surface are also congruent.

2. The system of claim 1, wherein lower side walls of the tray located below the plate are displaced inwards forming a bearing area.

3. The system of claim 1, wherein the tray has at its longitudinal sides a recessed grip for handling and positioning of the tray.

4. The system of claim 1, wherein the tray has at its smaller sides notches for its positioning on a loading drawer.

5. The system of claim 1, wherein the corners of the tray have an oblique shape.

6. The system of claim 5, wherein the corners have a by 45° inclined surface.

7. The system of claim 1, wherein the tray has 96 openings in a 4×24 arrangement.

8. The system of claim 1, wherein upper side walls located above the plate of the tray have openings at the corners of the tray so that the upper side walls can be pushed into a forked light barrier of the loading member.

9. The system of claim 1, further comprising a loading drawer with an open section for accommodating the tray.

10. The system of claim 9, wherein the open section has at its longitudinal sides only one side wall and comprises at the upper side of each smaller side of the opening a ridge for accepting a notch of the tray.

11. The system of claim 9, wherein the loading drawer comprises sliding rails for moving it into and out of a loading member.

12. The system of claim 11, wherein the loading member comprises guide rails for moving the loading drawer onto them.

13. The system of claim 12, wherein the guide rails comprise positioning springs for engaging into the recessed grip of the tray.

14. The system of claim 1, wherein loading member comprises a conveyer belt for transporting trays.

15. A method of using of a system comprising:
a tray having openings for accommodating pipette tips in a plate, wherein the openings have at their upper end a surrounding contour which has a curved surface area, wherein said curved surface is a partial section of a single spherical washer, and
pipette tips having at their upper end an offset forming a contact surface for the surrounding contour of the tray's opening, wherein the shape of the contact surface is a partial section of a single spherical washer, and wherein the partial sections of the single spherical washer of the tray's contour and the contact surface are identically curved and thus congruent, so that the centers of both spheres of surrounding contour and contact surface are also congruent; the method comprising a step of loading the pipette tips into the tray's openings.

* * * * *